United States Patent [19]

Rusinov

[11] Patent Number: 5,728,208

[45] Date of Patent: Mar. 17, 1998

[54] CONCRETE MIX, PROCESS FOR PREPARING SAME, AN ADDITIVE FOR CONCRETE MIX, AND PROCESS FOR PREPARING SAME

[75] Inventor: Alexander Rusinov, San Francisco, Calif.

[73] Assignees: Nadia Rusinoff; Helen Rusinoff, both of San Francisco, Calif.

[21] Appl. No.: 456,713

[22] Filed: Jun. 1, 1995

[51] Int. Cl.$^6$ .......................... C04B 14/00; C04B 22/00
[52] U.S. Cl. ...................... 106/734; 106/799; 106/815; 106/817; 106/819
[58] Field of Search ........................... 106/734, 799, 106/815, 817, 819

[56] References Cited

FOREIGN PATENT DOCUMENTS 55-051745  4/1980  Japan ........................ 106/819

OTHER PUBLICATIONS

WPIDS abstract No. 93-150265, which is an abstract of Soviet Union Patent Specification No. 1,733,414 (May 1992).

*Primary Examiner*—Anthony Green
*Attorney, Agent, or Firm*—Ilya Zborovsky

[57] ABSTRACT

A new concrete mix sodium nitrate, sodium carbonate, sodium sulfate, calcium chloride, calcium carbide, lime, cement, coarse aggregate and sand in a percent ratio of (0.51–0.70):(0.56–0.58):(0.66–0.90):(0.05–0.10): (0.17–0.40):(0.05–0.01):(25–30):(29.25–12):(30–35) mixed with 13.75 to 20% of water. A process for preparing the composition involves comminution of certain components to a predetermined range of particle size and a treatment to insure certain ranges of moisture content of various components of the composition.

9 Claims, No Drawings

5,728,208

CONCRETE MIX, PROCESS FOR PREPARING SAME, AN ADDITIVE FOR CONCRETE MIX, AND PROCESS FOR PREPARING SAME

FIELD OF THE INVENTION

The invention relates to building materials and construction and may be used in the preparation of concrete mixes for making prefabricated concrete and reinforced concrete products and for erecting cast-in-place concrete and reinforced concrete structures of buildings and installations in civil engineering, industrial construction and the like with the aim of improving surface tightness and strength and other vital properties of concrete.

BACKGROUND OF THE INVENTION

Various components added to concrete mixes (or cement-based mixes) are known to have a polyfunctional effect and are able to actively affect the structure of concrete and to eliminate undesirable side effects of components of various additives (Neville, Adam M. Properties of Concrete. UK. London. 1993). However, when a concrete mix is prepared, there is a problem of incompatibility of characteristics of the various components of concrete mix. The incompatibility results become manifest in 3 to 5 years in the form of salt spots, angle rounding and cracking that make the structure service life shorter. This is true for both mineral and polymeric additives in both liquid and colloidal phases. The incompatibility in terms of temperature expansion also occurs rather often, especially in a climate or in production spaces with frequent changes in ambient temperature and humidity.

Many prior art concrete mixes and additives have been developed to meet requirements of concrete resistance to attack. Specifications required certain admissible residual characteristics or admissible degree of wear of concrete. Maximum wear level of 3 to 5% had been adopted very long ago in Europe, in the USA and Great Britain. At the same time, this specification has been adopted only very recently in other countries (Russia, China). They used to adopt before a 10 to 15% level as the admissible degree of wear between overhauls. This explains different requirements imposed upon properties of concrete mixes. This is the reason why it is not possible to make a sensical comparison between popular compositions of concrete mixes used for prolonging service life of concrete structures.

OBJECTS OF THE INVENTION

It is an object of the invention to provide a concrete mix that has enhanced properties such as a prolonged service life of concrete structures.

Further object of the invention is to provide a concrete mix that can be used for making concrete with enhanced corrosion and frost resistance and improved permeability properties combined with a higher strength.

It is also an object of the invention to provide an additive for a concrete mix that can impart to a concrete mix enhanced properties such as a prolonged service life of concrete structures.

Additional object of the invention is to provide an additive for a concrete mix that can impart to a concrete mix enhanced corrosion and frost resistance and improved permeability properties combined with a higher strength.

Finally it is an object of the invention to provide a process for preparing a concrete mix and/or an additive for a concrete mix allowing final properties of concrete such as service life, permeability, frost and corrosion resistance and strength to be improved.

SUMMARY OF THE INVENTION

With the above and other objects and advantages in view, the invention provides a new concrete mix comprising the following combination of mineral components mixed with water: sodium nitrate, sodium carbonate, sodium sulfate, calcium chloride, calcium carbide, lime, cement, coarse aggregate and sand. These components are used in the proportioning to be described in detail below.

The invention also provides an additive to a concrete mix comprising the following combination of mineral components to be mixed with other components of a concrete mix during mixing: sodium nitrate, sodium carbonate, sodium sulfate, calcium chloride, calcium carbide, lime. These components are used in the proportioning to be described in detail below.

The invention also provides a process for preparing the above concrete mix or additive that involves a special preparation of some components aimed at improving useful properties of the additive and/or concrete made of a concrete mix with the composition according to the invention. The process involves certain steps of comminution of certain components to a predetermined range of particle size and a treatment to insure certain ranges of moisture content of various components of the composition according to the invention.

DESCRIPTION OF EMBODIMENTS

A concrete mix according to the invention comprises the following components, in percent by weight:

| | |
|---|---|
| sodium nitrate | 0.51–0.70 |
| sodium carbonate | 0.56–0.80 |
| sodium sulfate | 0.66–0.90 |
| calcium chloride | 0.05–0.10 |
| calcium carbide | 0.17–0.40 |
| lime | 0.05–0.1 |
| cement | 25–30 |
| coarse aggregate | 29.25–12 |
| sand | 30–35 |
| water | 13.75–20. |

It should be noted that each of the above components of the composition has its specific function. The quantitative proportioning of the components within the above-specified limits are such as to insure a relay-type reaction between the various components and between the components and products of intermediate reactions. It should also be noted that gross deviations from the above-specified limits for each and every component would inevitably bring about negative results and cause impairment of properties of concrete that can be even lower than the properties of conventional concrete.

The description that follows is given in support of the above proportioning of the various components of concrete mix according to the invention.

Sodium nitrate ($NaNO_3$) is used to accelerate hardening and also to inhibit corrosion of reinforcement in case a reinforced concrete structure is to be protected. If sodium nitrate level is below 0.51%, it cannot react with calcium hydroxide. The use of this component in excess of 0.70% by weight of the composition can result in an accelerated structure formation. If such is the case, all other components of the composition will not have time to react to the full extent.

Sodium carbonate ($Na_2CO_3$) is a plasticizer and a compacting hardening accelerator that improves concrete strength. If the level of this component is below 0.56%, it cannot succeed in delaying a premature structure formation within colloidal phases of cement stone. If added in excess of 0.8%, this component can cause an excessive gel formation and delayed formation of cement stone.

Sodium sulfate ($Na_2SO_4$) is used as a plasticizer of dispersed reaction products to insure uniformity of properties and phase equilibrium of the body of mortar which is a multiple-phase system. This component improves flexural and rupture strength and also enhances permeability properties. If added in an amount below 0.66%, sodium sulfate cannot plasticize the resulting concrete mix, and the resulting concrete structure is of a non-uniform density ranging from 4044 Lb./cub. yard (2000 kg/cu. m) to a loose structure. This component added in excess of 0.9% will decelerate setting to an inadmissible extent thus resulting in a loose concrete.

Calcium chloride is used as strong electrolyte that causes dissociation of anion-cation dipolar molecules to increase the yield of reaction of cement hydration and to raise pH of the pore fluid so as to improve frost resistance and permeability properties. With a level of calcium chloride below 0.05%, no dissociation reactions will take place, and pH of the pore fluid will remain unchanged. Used in an amount above 0.1% in the composition of the invention, calcium chloride will cause an increase in surfacing of hydroxyl salts with a strong trend toward evaporation. This results in salt spots and white flakes appearing first at the corners of concrete structures. This is well known as "white death of concrete".

Calcium carbide is used to insure an intensive gas removal from the mix. If calcium carbide level in the concrete mix according to the invention is below 0.17%, there is no gas removal effect. If calcium carbide is used in excess of 0.40%, it can cause a premature dehydration and cracking of the concrete surface because of the exothermic overheating.

Lime is used as an absorbent for dry components during the first stage of preparation of concrete mix (dry mixing) and also as a plasticizer for coarse-grained components of concrete mix at the second stage of preparation (mixing with water). If a lime level in the composition is below 0.05%, the above functions of absorption and plasticizing cannot be insured, and if added in excess of 0.1%, lime can cause gravity separation of mix.

Cement is used as a binder for concrete mix. It is the primary component for forming structure of the body of concrete. Used in an amount lower than 25% cement cannot insure an adequate strength of the resulting concrete, and with a cement level in excess of 30% shrinkage and thermal expansion cracking can occur.

Sand is used as an aggregate forming a matrix to be filled with uniformly distributed components of concrete mix at the first stage of preparation (dry mixing). The use of sand in an amount less then 30% impairs concrete strength, and its use in excess of 35% can result in increased temperature and shrinkage deformations.

Coarse aggregate (such as gravel, crushed stone, and the like) is used to save cement while retaining strength. If used in excess of 29.25%, coarse aggregate can impair plasticity of concrete mix. An amount below 12% results in a lower compressive strength.

Water is used as a solvent for the various mineral components of the concrete mix and as the primary component of cement hydration reaction. A water level less than 13.25% is inadequate to dissolve components of the mix and hydration of cement. If water is added in excess of 20%, concentration of the various dissolved components of the mix is decreased, cement setting is delayed, and setting quality of cement paste is lowered.

It will be apparent to those skilled in the art that the above composition and proportioning of components of the concrete mix according to the invention including the limits of their contents as given and supported above are aimed at insuring improved properties of concrete and represent a new combination of limitations for obtaining a new result of the invention.

It will be apparent to those skilled in the art that the above composition of concrete mix may be used, e.g., when a concrete mix is prepared to meet specific requirements of any given application where contents of all components of concrete mix may vary to achieve preset results. It is, however, known, that in the majority of practical uses of concrete mixes contractors would prefer to have ready-made additives that can be added to commercially available dry concrete mixes or, which is the most preferred application, to concrete mixes ready for placing by mixing them with an additive.

The invention provides an additive for a concrete mix having the following composition, in percent by weight:

| | |
|---|---|
| sodium nitrate | 19–22 |
| sodium carbonate | 23–26 |
| sodium sulfate | 27–30 |
| calcium chloride | 10–12 |
| calcium carbide | 12–17 |
| lime | 9–3. |

This additive can be added to a concrete mix in a predetermined proportioning with reference to the weight of cement in the concrete mix. The limits of content of each component are chosen based on the same considerations as those given above for the composition of the concrete mix according to the invention. The additive according to the invention is added to a concrete mix in an amount of 6 to 10% by weight of cement available in the concrete mix. If the additive is used in an amount of less than 6% by weight of cement, it will not have the desired effect on properties of the resulting concrete. Adding more than 10% of the additive will result in all disadvantages that are described above in supporting the upper limits of the respective components of the concrete mix according to the invention.

It will be understood that the above-described concrete mix may be prepared in a variety of known per se ways and can still provide for a new result of the invention. For example, all components of the above-described concrete mix may be mixed by using a sequence, techniques and equipment that are well known to those skilled in that art and that do not have any material bearing on this invention. This is why such process and equipment are not described here in detail.

It is, however, preferred that this concrete mix be prepared in two stages, with various components being prepared in a predetermined manner so as to further enhance useful result of the invention thanks to a better initial quality of the composition.

When the above-described composition is mixed with water and applied to a surface of concrete being protected, a number of consecutive and simultaneous reactions take place between the components of the composition and between them and cement components as follows:

1. $CaO+H_2O \rightarrow \downarrow Ca(OH)_2$

2. $Ca(OH)_2+NaNO_3 \rightarrow \downarrow Ca(OH)NO_3+NaOH$

3. $Ca(OH)_2+Na_2CO_3 \rightarrow \downarrow CaCO_3+2NaOH$

4. $Ca(OH)_2+Na_2SO_4 \rightarrow \downarrow CaSO_4+2NaOH$

5. $Ca(OH)_2+CaCl_2 \rightarrow \downarrow Ca(OH)Cl_2+CaOH$ \hfill (1)

Free calcium oxide of cement forms calcium hydroxide when mixed with water (reaction 1). Calcium hydroxide then takes part in exchange reactions with sodium nitrate and calcium carbonate and sulfate and with calcium chloride to form low-soluble and hardly-soluble acicular crystals of hydroxonitrates $Ca(OH)NO_3(1)$ that will continue to grow well after completion of structure forming of cement stone by using free pore water and Ca ions released from cement stone gel. These crystals have a micro-reinforcing effect on segregation within voids under the effect of temperature, shrinkage and corrosion. Therefore, a primary structure reinforcement framework is formed within the concrete mix as early as at the setting stage. This framework is built up in the direction of mass transfer of a diffusion flow.

Hardly soluble double salts of calcium sulfoaluminate $3CaAl_2O_3CaSO_4.31H_2O$ are crystallized at the same stage. The crystals are in the form of hexagonal syngonite-like structures or a package of parallel laminae with interstices filled with intercrystalline solutions. The density, volume and strength of the entire package depends on density of such solutions. When moisture gets into the interstices, the solutions are diluted, and the package volume increases. Given the conditions in the pore space of concrete, this is the explanation of an exponential decrease in permeability with time during tests. If temperature decreases, the intercrystalline solutions break into crystalline hydrates and solutions of residual concentration. The volume of the interstices decreases, and density and strength of structure as a whole increase to ensure a high frost resistance.

During a further maturing stage, low-soluble double salts of calcium nitrochloroaluminate $2CaOAl_2O_3Ca(OH)Cl_2.10H_2O$ are formed on the primary framework in the form of the same hexagonal syngonite-like structures. However, concentration of the intercrystalline solutions is so high that their density does not almost change with an inflow of moisture from outside. High level of molecular bonds is explained by the effect of chlorine ions upon dipolar water molecules. This phenomena is similar to the case where water is magnetically treated before mixing concrete components to improve concrete strength.

The components of the concrete mix according to the invention react in the following sequence:

$$Cl_2>NO_3>SO_4 \qquad (2)$$

Adding chlorine ions to the compounds dissolved in water has a polarizing effect on dipolar water molecules to lower the level of molecular bonds of water. Owing to weak bonds in the presence of calcium hydroxide, an alkali group is released into the water to protect calcium against dissolution at the maturing stage:

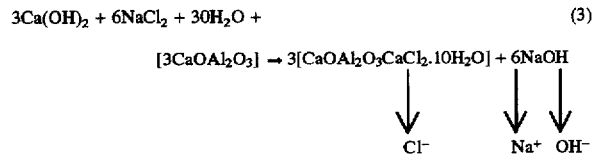

$$3Ca(OH)_2 + 6NaCl_2 + 30H_2O + \qquad (3)$$
$$[3CaOAl_2O_3] \rightarrow 3[CaOAl_2O_3CaCl_2.10H_2O] + 6NaOH$$

Tricalciumalumochloride formed as a result of reaction (3) forms hardly soluble solid phases when water is released for simultaneous hydration reactions. The alkali and the internal pore moisture form solutions inhibiting metal corrosion that also have a low eutectic temperature of $-126°$ F. ($-70°$ C.) at the stage of a stable phase condition of cement stone.

At the stage of unstable phases, owing to weak bonds of water molecules that are depolarized with chlorine ion and weak bonds of the reaction products (3), nitrate ions come to react, and the sequence of these reactions is determined by their inherent chemical activity, alkali level of the solution, and the intermediate reaction product—calcium aluminate—with which the following dissociation reaction is most likely:

$$3Ca(OH)_2 + 6NaNO_3 + 32H_2O + \qquad (4)$$

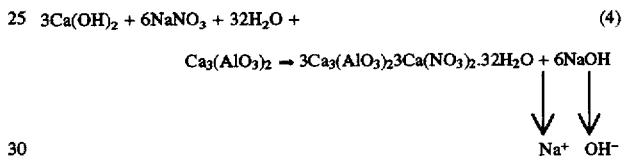

$$Ca_3(AlO_3)_2 \rightarrow 3Ca_3(AlO_3)_2 3Ca(NO_3)_2.32H_2O + 6NaOH$$

This reaction yields a low-soluble double salt of calcium hydronitroaluminate with an increase in pH of the pore fluid. The stability of reaction (4) is insured by an almost simultaneous reaction of sodium sulfate. The consumption of starting components for another reaction (5) results in their shortage and in a one-way character of dissociation:

$$3Ca(OH)_2+3Na_2SO_4+31H_2O+Ca_3(AlO_3)_2 \rightarrow 3\,CaO\,Al_2O_3$$
$$CaSO_4.31H2O+6NaOH \qquad (5)$$

yielding calcium hydrosulfoaluminate.

Therefore, if such an electrolyte is added at a concentration that insures a change in solubility of mineral binders without reacting with them, with a subsequent formation of hardly soluble complex compounds—calcium hydrosulfoaluminate, calcium chloroaluminate and tricalcium chloroaluminate from the resulting solution, the overall volume of the crystalline component of the structure increases all at once in parallel with normal concrete cure.

The advantage of complex additives is explained by the fact that although the rate of formation of double salts is lower then in the case of a single additive (which is due to the consumption of calcium aluminate of the liquid phase for hydration), cement components can react at a lower reaction constant. Moreover, a protracted reaction allows the ion force of free water (which later becomes the pore fluid) to become stronger so as to form saturated solutions form additional double hydrate salts.

Calcium electrolytes containing calcium accelerate hydration and hardening of silicate phases of cement owing to a higher probability of formation of three-dimensional germs of a new phase. These electrolytes also disperse the products of hydration through dissociation with anion-cation groups:

$$Ca(OH)_2+Na_2CO_3 \rightarrow CaCO_3+2Na^++2OH^- \qquad (6)$$

The above-described processes insure a high hardening rate and a fast rise of concrete strength.

The use of additives containing a complex of sodium and chloride insures a better use of the potential of allite 3CaOSiO$_2$C$_3$S. Chloride ions that are still in the liquid phase are products of displacement. They form solvation shells at the boundaries of cation fields thereby preventing free calcium from leaving the structure-forming reactions. At the same time, nitrate ions accumulate in the free water polarized with chlorine ions to form solutions of increasing ion strength. These solutions will, in turn, accelerate hydration of allite. The manifest relay-like character of these processes allows allite to develop to a greater extent into a symmetrical three-dimensional conglomeration with isotropic properties.

The additives containing NaNO$_3$ and Na$_2$SO$_4$ also participate in exchange reactions similar to (6). It should be, however, noted that these components used as herein disclosed decelerate dissociation of ions because of accumulation of NaOH alkali in the aqueous solution in the presence of calcium hydroxide. This allows the group of belites $\beta$2CaOSiO$_2$ ($\beta$-C$_2$S) that are lagging in their development in comparison with allite to cause an exponential increase in the group of calcites and silicates that failed to be attached in previous hydration reactions. As the components causing formation of calcium solfoaluminate are well soluble, and sulfate ion is present in the solution at a high concentration after displacement, the aluminate available in the system is fully bound into sulfoaluminate during setting of the structure. With further curing of the concrete mix, no sulfoaluminate is formed, and this results in an improved sulfate resistance of concrete, a better strength and frost resistance.

Adding electrolytes results in intensification of chemical reactions and a better solubility of cement clinker minerals in water. They also accelerate the exchange reactions. The resulting products of hydrolysis and hydration, which are in the form of crystals and gel, actively coagulate. It should be noted that gel expands due to the absorption of a large amount of water. This enhances adhesion of the aggregate of the mix and results in clogging of pores and compaction of concrete stone.

It should be noted that adding calcium carbide improves isotropism of concrete structure. It is known that a scatter of test results is mainly associated with, and depends on ambient temperature and mixing water temperature. These temperatures affect the rate and completeness of the above-described reactions. Adding calcium carbide stabilizes the local temperature field of the mix during the calcium carbide quenching. A stable calcium carbide quenching reaction is insured by making the specific choice of particle size and moisture content of calcium carbide and also of water/ cement ratio as disclosed herein.

It has been found that the additives containing chlorine, nitrate and sulfate ions can have a negative effect if the proportioning of the respective components of the composition according to the invention deviates from that disclosed herein. Excessive amounts of calcium chloride may cause calcium spots to appear on the surface as a result of a worse solubility of the initial phases and fresh-formed compounds. An excess of sodium nitrate and sodium carbonate results in an increase in pH of pore fluid. An excessive accumulation of pore fluid causes an alkaline corrosion of siliceous aggregate and silicates of cement stone.

The formation of calcium sulfoaluminate crystals is limited by the rate of dissolution of gypsum available in cement. Therefore, in the case of an excess of sodium sulfate, low-soluble calcium hydrosulfoaluminate and calcium carbonate crystals formed against the background of an excess of sodium sulfate expand during completion of hardening of the structure. This is the reason why micro-cracks that cannot be eliminated by wetting of concrete appear at the final stage of hardening. This lowers strength and density of the structure.

Therefore, the relay-like character of the reactions results in a rapid formation of a primary framework of acicular crystals of calcium hydroxo-salts at the stage of concrete setting. This framework is overgrown with lamellar crystals of calcium sulfoaluminate, calcium nitrochloroaluminate and calcium hydrosilicate. The formation of hardly-soluble crystalline structures raises density of cement stone and acts like a micro-reinforcement. These structures reduce permeability of concrete and preserve its plastic properties.

A short setting time, high compressive strength, high tensile and flexural strength, low permeability, sulfate and alkali resistance, frost resistance and low labor effort for the preparation and use—those are the main characteristics of the concrete mix according to the invention.

PREPARATION OF THE CONCRETE MIX AND/
OR ADDITIVE

In its preferred form, a process for preparing the concrete mix according to the invention is divided into two stages: preparation of a dry mix and preparation of a water mix or concrete mix proper.

For preparing a dry mix, the various components of the concrete mix are preferably prepared as described below.

Sodium nitrate, sodium carbonate, sodium sulfate and calcium chloride are checked for moisture content and are dried, if necessary to a moisture content of 3 to 6%. If these components are dried to a moisture level below 3%, the ambient humidity will work to cause an intensive moisture absorption up to a hygrometry equilibrium level. If a moisture level in these components is above 6%, they can spontaneously react and degenerate.

Calcium carbide is comminuted, e.g., by crushing, to a range of particle size to a fraction of 0.063" to 0.118" (0.16–0.30 mm) and is then dried in any appropriate drier to a moisture content of 6 to 8%. If comminuted to a particle size finer than 0.063" (0.16 mm), calcium carbide does not exhibit the desired intensity of hydrate decomposition and cannot insure the required temperature as a result of hydration. With particles coarser than 0.118" (0.30 mm), calcium carbide cannot be uniformly distributed within the bulk of dry mix so as to insure the simultaneous carbide reaction through the entire body of a fresh-placed concrete. Calcium carbide cannot be at a moisture content below 6% because of a so called critical mass of hydrate groups. The component will lose its principal properties and structure beyond this critical mass. Calcium carbide can decompose with a moisture content in excess of 8%.

Lime is dried, preferably in an electric furnace at 2012° F.–2732° F. (1000° C.–1500° C.) during 4 hours to a moisture content of 2 to 3% and comminuted to a fraction of 0.063" to 0.079" (0.16–0.20 mm). The temperature limits given above insure the minimum moisture content of 2% on the one hand, and on the other hand, allow the roasting effect that could be conducive to a lower quenching capacity to be avoided. The above-given particle size range insures the desirable time for lime reaction with water. With a particle size below 0.063" (0.16 mm), the quenching reaction will lose intensity and will be rather protracted to cause an excessive gas release to the surface of the resulting protective coating and shrinkage. With particles coarser than 0.079" (0.20 mm), uniform distribution of lime within the bulk of dry mix becomes a problem.

Sand is sieved to a fraction of 0.063" to 0.079" (0.16 to 0.20 mm) and is dried, preferably in an electric furnace at 302° F. to 392° F. (150° C. to 200° C.) during 4 hours to obtain a moisture content of 3% and to remove organic matter and is then comminuted to a fraction of 0.063" to 0.079" (0.16 to 0.20 mm). This treatment is necessary to have an optimum sand matrix to be filled with the other components of the mix and to prevent organic matter from impairing properties and long-term protective quality of the resulting concrete.

Gravel is screened to the desired fraction and dried in a manner similar to sand drying.

The conduct of the process of preparation of the composition according to the invention at this stage depends on the manner in which the mix is to be used. If the mix according to the invention is to be stored as a ready-made dry mix for further used and/or distribution and shipment to potential customers, it is loaded, after adding cement, to a mixer and mixed for 35 to 50 minutes in a known manner. The resulting dry mix can be stored for one year. For application, this dry mix has to be mixed with water in the amount specified above to prepare a mortar in a known manner.

If the concrete mix according to the invention is to be used immediately after the preparation of the dry mix as described above, water can be metered during 15 minutes into the same mixer without turning it off, and the composition will be ready for application.

The additive according to the invention is prepared as described above with reference to the preparation of the various mineral components. The only difference is that cement, sand and gravel are not added. For the rest, the particle size, treatment and moisture content values are the same as described above for the process for the preparation of the concrete mix.

It will be apparent to those skilled in the art that the above-described process for preparing the concrete mix and/or additive thereto according to the invention insures an enhanced result of the invention owing to a combination of steps and limitations recited in the appended claims.

PRACTICAL EXAMPLES

To assess properties of the concrete mix according to the invention, tests have been conducted with concrete specimens. Central compression and frost resistance tests were carried out with cubes of 3.93" (10 cm). Flexural strength and sulfate and alkali corrosion tests were conducted with concrete beams of 6"×6"×20" (15×15×50 cm). Rupture tests were conducted with spool specimens 20" (50 cm) long and 1.5" (4 cm) in diameter. Permeability tests were conducted with cylindrical specimens of 6" (15 cm) diameter 15" (30 cm) long.

Example 1—Prior Art

A concrete mix for structures operating in aggressive sulfate environments (Reduction of Concrete Permeability [Ponizhenie pronitsaemosti betona] by Yu. V. Chekhovsky. Moscow. Energiya Publishing Co. 1968, p. 127–128) was used for comparison. The concrete mix contained the following components, in % by weight:

| | |
|---|---|
| sodium carbonate | 0.8 |
| sodium chloride | 0.5 |
| alumina | 0.8 |

-continued

| | |
|---|---|
| sodium sulfate | 1.4 |
| Ash | 12 |
| Cement | 20 |
| Sand | 15 |
| Gravel | 22 |
| Water | 27.5 |

Example 2—Concrete Specimens Without Additives

Concrete specimens were prepared of a mix containing 250 Lb. (113 kg) of cement (3000 Lb./sq. inch or 210 kg/sq. cm), 1345 Lb. (610 kg) of sand, 2426 Lb. (1100 kg) of gravel of a size 0.197"–0.787" (0.5 to 2 cm), and 58 gallon (220 l) of water.

Compositions According to the Invention

Example 3

| | |
|---|---|
| sodium nitrate | 0.51 |
| sodium carbonate | 0.56 |
| sodium sulfate | 0.66 |
| calcium chloride | 0.05 |
| calcium carbide | 0.17 |
| lime | 0.05 |
| cement | 25 |
| gravel | 29.25 |
| sand | 34 |
| water | 13.75 |

Example 4

| | |
|---|---|
| sodium nitrate | 0.70 |
| sodium carbonate | 0.80 |
| sodium sulfate | 0.90 |
| calcium chloride | 0.10 |
| calcium carbide | 0.40 |
| lime | 0.1 |
| cement | 30 |
| coarse aggregate | 12 |
| sand | 35 |
| water | 20 |

Example 5

| | |
|---|---|
| sodium nitrate | 0.6 |
| sodium carbonate | 0.7 |
| sodium sulfate | 0.75 |
| calcium chloride | 0.075 |
| calcium carbide | 0.30 |
| lime | 0.065 |
| cement | 27 |
| gravel | 20.51 |
| sand | 33 |
| water | 17 |

Example 6

Concrete mix of Example 5 without calcium carbide.

Example 7

Concrete mix of Example 5 with calcium carbide particles size of 0.2" (0.5 cm) which is 69% larger than claimed.

Example 8

Concrete mix of Example 5 with calcium chloride level of 1% which is 85% higher than claimed.

TABLE 1

| Example | Strength test results, MPa | | | | | | Frost resistance, cycles | Corrosion* resistance, MPa | Permeability* atm. | Hardening time, minutes |
|---|---|---|---|---|---|---|---|---|---|---|
| | Compression | | Flexural | | Rupture | | | | | |
| | 7 | 28 | 7 | 28 | 7 | 28 | | | | |
| 1 | 1.8 | 2.4 | 1.2 | 1.8 | 0.07 | 0.13 | 200 | 0.9/1.1 | 8 | 42 |
| 2 | 1.6 | 2.2 | 0.9 | 1.7 | 0.08 | 0.13 | 75 | 0.55/0.8 | 6 | 120 |
| 3 | 2.4 | 2.9 | 1.9 | 2.5 | 0.14 | 0.36 | 350 | 1.7/2.1 | 16 | 25 |
| 4 | 2.4 | 2.9 | 1.9 | 2.5 | 0.14 | 0.36 | 350 | 1.7/2.1 | 16 | 25 |
| 5 | 2.4 | 2.9 | 1.9 | 2.5 | 0.14 | 0.36 | 350 | 1.7/2.1 | 16 | 25 |
| 6 | 2.0 | 2.5 | 1.4 | 2.0 | 0.12 | 0.18 | 250 | 1.1/1.3 | 14 | 40 |
| 7 | 2.2 | 2.3 | 1.4 | 1.9 | 0.09 | 0.16 | 250 | 1.4/1.4 | 14 | 20 |
| 8 | 2.4 | 3.0 | 1.8 | 2.4 | 0.11 | 0.20 | 300 | 0.66/0.96 | 14 | 25 |

*Acid/sulfate corrosion.

Example 9

Additive was added to the concrete mix of Example 2 in an amount of 6%. The additive had the following composition, in percent by weight was added:

| | |
|---|---|
| sodium nitrate | 19 |
| sodium carbonate | 23 |
| sodium sulfate | 27 |
| calcium chloride | 10 |
| calcium carbide | 12 |
| lime | 9. |

The test results were as follows:

| | | | | |
|---|---|---|---|---|
| Compression | 7 days | 2.4 MPa | 28 days | 2.9 MPa |
| Flexure | 7 days | 1.9 MPa | 28 days | 2.5 MPa |
| Rupture | 7 days | 0.1 MPa | 28 days | 0.36 MPa |

Frost resistance 350 freezing/thawing cycles.
Corrosion resistance: acid 1.7 MPa; sulfate 2.1 MPa.
Permeability 16 atm.
Setting time 45 minutes.

Example 10

Additive was added to the concrete mix of Example 2 in an amount of 6%. The additive had the following composition, in percent by weight was added:

| | |
|---|---|
| sodium nitrate | 22 |
| sodium carbonate | 26 |
| sodium sulfate | 30 |
| calcium chloride | 12 |
| calcium carbide | 17 |
| lime | 3. |

The test results were as follows:

| | | | | |
|---|---|---|---|---|
| Compression | 7 days | 2.4 MPa | 28 days | 2.9 MPa |
| Flexure | 7 days | 1.9 MPa | 28 days | 2.5 MPa |
| Rupture | 7 days | 0.14 MPa | 28 days | 0.36 MPa |

Frost resistance 350 freezing/thawing cycles.
Corrosion resistance: acid 1.7 MPa; sulfate 2.1 MPa.
Permeability 16 atm.
Setting time 45 minutes.

Permeability Test Procedure

Cylindrical specimens (diam. 15 cm, length 30 cm) were put into a hydraulic press. The specimens were water pressure tested with a pressure increments of 2 atm. every 4 to 6 hours. The test was completed when a first drop could be seen on the specimen surface.

Corrosion Resistance Test Procedure

The effect of sulfate and alkali corrosion were tested with concrete beams (15×15×20 cm). The beams were allowed to stay for 36 hours in aqueous solutions of 5% sodium sulfate and 4% sulfuric acid. The beams were then tested for flexural strength (or compression or rupture). A strength decrease by more than 5% was regarded as inadmissible.

It will be apparent to those skilled in the art from what is described above that the invention allows concrete properties to be substantially improved in terms of protection from chemical attacks and corrosion and its surface strength and frost resistance can be greatly improved.

It is understood that the use of this composition would not be compromised if it is prepared by using conventional mixing techniques. On the other hand, it will be apparent that the combined use of the composition and process for its preparation allows the best results of the invention to be had.

Various other modifications can be made in the concrete mix according to the invention without departure beyond the spirit and scope of the appended claims. Thus the concrete mix may contain other additives (such as plasticizers and the like) that are normally used with concrete and mortar mixes without affecting the invention result.

I claim:

1. A concrete mix, said concrete mix comprising the following components, in % by weight:

| | |
|---|---|
| sodium nitrate | 0.51–0.70 |
| sodium carbonate | 0.56–0.80 |
| sodium sulfate | 0.66–0.90 |
| calcium chloride | 0.05–0.10 |
| calcium carbide | 0.17–0.40 |
| lime | 0.05–0.1 |
| cement | 25–30 |
| coarse aggregate | 29.25–12 |
| sand | 30–35 |
| water | 13.75–20. |

2. The concrete mix of claim 1, wherein calcium carbide has a particle size of 0.063" to 0.118" (0.16–0.30 mm) and a moisture content of 6 to 8% by weight.

3. The concrete mix of claim 2, wherein sodium nitrate, sodium carbonate, sodium sulfate, calcium chloride have a moisture content of 3 to 6% by weight.

4. An additive for a concrete mix, comprising the following components, in percent by weight:

| | |
|---|---|
| sodium nitrate | 19–22 |
| sodium carbonate | 23–26 |
| sodium sulfate | 27–30 |
| calcium chloride | 10–12 |
| calcium carbide | 12–17 |
| lime | 9–3. |

5. The additive of claim 4, wherein calcium carbide has a particle size of 0.063" to 0.118" (0.16–0.30 mm) and a moisture content of 6 to 8% by weight.

6. The additive of claim 5, wherein sodium nitrate, sodium carbonate, sodium sulfate, calcium chloride have a moisture content of 3 to 6% by weight.

7. A process for preparing an additive for concrete mix, said process comprising:

comminuting calcium carbide to a particle size of 0.063" to 0.118" (0.16–0.30 mm);

treating lime at 2012° F. to 2732° F. (1000°–1500° C.) for 4 hours to a moisture content of 2 to 3% by weight to prepare dried lime and comminuting the resulting dried lime to a particle size of 0.063" to 0.079" (0.16 to 0.2 mm);

mixing under stirring said comminuted calcium carbide having a moisture content of 6 to 8 % by weight and said comminuted treated lime with sodium nitrate, sodium carbonate, sodium sulfate, calcium chloride, cement, sand and water, in % by weight:

| | |
|---|---|
| sodium nitrate | 19–22 |
| sodium carbonate | 23–26 |
| sodium sulfate | 27–30 |
| calcium chloride | 10–12 |
| calcium carbide | 12–17 |
| lime | 9–3. |

8. The process of claim 7, wherein sodium nitrate, sodium carbonate, sodium sulfate, calcium chloride have a moisture content of 3 to 6% by weight.

9. A concrete mix comprising cement, a coarse aggregate, sand and water, said concrete mix further comprising an additive in an amount of 6 to 10% by weight of cement available in the concrete mix, said additive having the following composition in percent by weight:

| | |
|---|---|
| sodium nitrate | 19–22 |
| sodium carbonate | 23–26 |
| sodium sulfate | 27–30 |
| calcium chloride | 10–12 |
| calcium carbide | 12–17 |
| lime | 9–3. |

* * * * *